USO09341274B2

United States Patent
Miyazoe et al.

(10) Patent No.: US 9,341,274 B2
(45) Date of Patent: May 17, 2016

(54) SOLENOID-OPERATED PILOT TYPE SPOOL VALVE

(71) Applicant: SMC CORPORATION, Chiyoda-ku (JP)

(72) Inventors: Shinji Miyazoe, Moriya (JP); Yoichi Morodomi, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/600,718

(22) Filed: Jan. 20, 2015

(65) Prior Publication Data

US 2015/0226344 A1    Aug. 13, 2015

(30) Foreign Application Priority Data

Feb. 10, 2014    (JP) .................................. 2014-023511

(51) Int. Cl.
| F16K 11/07 | (2006.01) |
| F16K 11/065 | (2006.01) |
| F15B 13/04 | (2006.01) |

(52) U.S. Cl.
CPC .............. *F16K 11/065* (2013.01); *F16K 11/07* (2013.01); *F16K 11/0716* (2013.01); *F15B 13/0402* (2013.01); *Y10T 137/7767* (2015.04); *Y10T 137/86614* (2015.04); *Y10T 137/86879* (2015.04)

(58) Field of Classification Search
CPC ................... Y10T 137/7764; Y10T 137/7766; Y10T 137/7767; Y10T 137/86614; Y10T 137/86879; F16K 11/065; F16K 11/07; F16K 11/0716; F15B 13/0402
USPC ........... 137/489, 491, 489.3, 625.46, 625.64; 251/30.01, 33
See application file for complete search history.

(56) References Cited

U.S. PATENT DOCUMENTS

| 3,425,449 A | * | 2/1969 | Leibfritz ............... | F16K 31/426 |
| | | | | 137/625.64 |
| 3,913,620 A | * | 10/1975 | Pauliukonis .......... | F16K 31/363 |
| | | | | 137/625.27 |
| 4,150,695 A | * | 4/1979 | Kosugui ................ | F16K 31/426 |
| | | | | 137/625.64 |
| 4,245,671 A | * | 1/1981 | Kosugui ............... | F15B 13/0431 |
| | | | | 137/625.6 |
| 4,257,572 A | * | 3/1981 | Neff ..................... | F15B 13/0431 |
| | | | | 137/513.5 |
| 4,524,803 A | * | 6/1985 | Stoll ..................... | F16K 27/041 |
| | | | | 137/625.64 |
| 4,526,201 A | * | 7/1985 | Geyler, Jr. ........... | F15B 13/0403 |
| | | | | 137/625.63 |

(Continued)

FOREIGN PATENT DOCUMENTS

JP        9 42525       2/1997

*Primary Examiner* — William McCalister
(74) *Attorney, Agent, or Firm* — Oblon, McClelland, Maier & Neustadt, L.L.P (57) ABSTRACT

A pilot passage that is in communication with an input port at all times is formed inside a spool, the pilot passage and a second pressure receiving chamber on one side of a pilot piston are made to be in communication with each other at all times through a constantly open communication passage formed in a continuous portion between the spool and the pilot piston, the second pressure receiving chamber and a first pressure receiving chamber on the other side of the pilot piston are made to be in communication with each other through an opening/closing communication passage that is formed in a piston box and that is opened and closed with a pilot valve, and the pilot piston is driven and the spool is switched by turning the pilot valve on and off to supply/discharge pilot air to/from the first pressure receiving chamber.

8 Claims, 5 Drawing Sheets

(56) References Cited

U.S. PATENT DOCUMENTS

| | | | | |
|---|---|---|---|---|
| 5,273,074 A * | 12/1993 | Conradt | F15B 13/0402 137/269 |
| 5,529,088 A * | 6/1996 | Asou | F15B 13/0825 137/271 |
| 5,558,122 A * | 9/1996 | Kawamura | F15B 13/0814 137/596.17 |
| 5,558,126 A * | 9/1996 | Hayashi | F15B 13/043 137/269 |
| 5,597,015 A * | 1/1997 | Asou | F15B 13/043 137/625.64 |
| 5,615,710 A * | 4/1997 | Sato | F15B 13/0402 137/625.64 |
| 5,623,967 A * | 4/1997 | Hayashi | F15B 13/0402 137/625.64 |
| 5,718,263 A * | 2/1998 | Sato | F15B 13/0402 137/271 |
| 6,142,182 A * | 11/2000 | Akimoto | F15B 13/0817 137/625.64 |
| 6,186,161 B1 * | 2/2001 | Hiramatsu | F15B 13/0817 137/271 |
| 6,220,284 B1 * | 4/2001 | Hayashi | F15B 13/0402 137/554 |
| 6,263,915 B1 * | 7/2001 | Hayashi | F15B 13/0402 137/554 |
| 6,267,140 B1 * | 7/2001 | Hayashi | F15B 13/0402 137/554 |
| 6,283,149 B1 * | 9/2001 | Hayashi | F15B 13/0402 137/554 |
| 6,427,720 B1 * | 8/2002 | Hayashi | F15B 13/0402 137/554 |

* cited by examiner

SOLENOID-OPERATED PILOT TYPE SPOOL VALVE

TECHNICAL FIELD

The present invention relates to a solenoid-operated pilot type spool valve that switches a spool with a solenoid operated pilot valve.

BACKGROUND ART

Solenoid-operated pilot type spool valves that switch a spool with a solenoid operated pilot valve are, as disclosed in Patent Literature 1, for example, already known. Such kinds of spool valve include a double pilot operated spool valve having two pilot valves, and a single pilot operated spool valve having a single pilot valve.

Among the above, in a double pilot operated spool valve, pilot air is alternately made to act on pilot pistons that are provided on both sides of a spool by alternately turning the two pilot valves on and off to reciprocate the spool so that flow passages between a plurality of ports are switched.

On the other hand, in a single pilot operated spool valve, pilot pistons having diameters that are different from each other are disposed on one end and the other end of a spool, and by supplying and discharging pilot air to and from the pilot piston with a large diameter by turning the pilot valve on and off while the pilot air is made to act on the pilot piston with a small diameter, the flow passages between a plurality of ports are switched by reciprocation of the spool using the difference in acting force according to the difference in pressure receiving areas between the two pilot pistons.

As disclosed in Patent Literature 1, typically, in the spool valve of the above kind, piston boxes are connected to both ends of a valve body built in with a spool, the pilot pistons are accommodated inside the piston boxes, and pilot air is guided from an input port formed in the valve body to the piston boxes through a pilot passage that passes through the inside of the valve body such that the pilot air is made to act on the pilot pistons through the passages formed inside the piston boxes.

Accordingly, in the above-described conventional spool valves, the pilot passage needs to be further formed inside the valve body which is provided with a plurality of ports for input, output, and exhaustion, depressions and holes for attaching various parts, and a plurality of fitting holes for fitting to a manifold base, and as a result, the internal structure of the valve body becomes complex leading to a problem of complexity in design and fabrication.

CITATION LIST

Patent Literature

[PTL 1] Japanese Unexamined Patent Application Publication No. 9-42525

SUMMARY OF INVENTION

Technical Problem

A subject of the present invention is to provide a solenoid-operated pilot type spool valve that does not need to form a pilot passage inside a valve body and, accordingly, that has a simple internal valve body structure allowing design and fabrication of the solenoid-operated pilot type spool valve to be facilitated.

Solution to Problem

In order to achieve the above subject, a solenoid-operated pilot type spool valve of the present invention includes a main valve portion that includes a valve body having input, output, and exhaustion ports, a valve hole formed inside the valve body so as to penetrate the valve body and so as to be in communication with the ports, a spool that is inserted into the valve hole so as to be slidable in an axis direction of the valve hole, the spool opening and closing flow passages that connect the ports to each other, and a pilot passage that is formed inside the spool, the pilot passage being in communication with an input port of the input ports at all times irrespective of an operating position of the spool; a pilot valve portion provided at an end portion of the valve body; and the pilot valve portion including a piston box connected to the valve body, a pilot piston that is formed so as to be continuous with an end portion of the spool and that is accommodated inside the piston box in a slidable manner, the pilot piston having a diameter that is larger than a diameter of the spool, a first pressure receiving chamber and a second pressure receiving chamber that are partitioned on one side and the other side of the pilot piston, a constantly open communication passage that is formed in a continuous portion between the spool and the pilot piston so as to communicate the pilot passage and the second pressure receiving chamber to each other at all times, an opening/closing communication passage that is formed in the piston box so as to communicate the pilot passage and the first pressure receiving chamber through a pilot valve, and the pilot valve of a solenoid-operated type that opens and closes the opening/closing communication passage.

In the present invention, one end of the opening/closing communication passage is in communication with the second pressure receiving chamber so as to be in communication with the pilot passage through the second pressure receiving chamber and the constantly open communication passage.

Furthermore, in the present invention, preferably, the pilot piston is formed as a different body with respect to the spool and is coupled to the spool, and the constantly open communication passage is formed by a gap interposed between the spool and the pilot piston.

In the above case, a pressure receiving area of a first pressure receiving surface of the pilot piston that faces the first pressure receiving chamber and a pressure receiving area of a second pressure receiving surface of the pilot piston that faces the second pressure receiving chamber are equivalent with respect to each other, and a pressure receiving area of a spool pressure receiving surface of the spool that faces the second pressure receiving chamber is smaller than the pressure receiving area of the second pressure receiving surface of the pilot piston.

Alternatively, the pilot piston and the spool may be integrally formed by a single material, and the constantly open communication passage may be open in a lateral side of the pilot piston or in a lateral side of the spool and may be formed by a through hole that is in communication with the second pressure receiving chamber.

Furthermore, in the present invention, preferably, a piston packing that is attached to an outer periphery of the pilot piston is a lip-type piston packing that has seal directionality, and the piston packing is disposed in a direction that does not block air from going to the second pressure receiving chamber from the first pressure receiving chamber but blocks air from going to the first pressure receiving chamber from the second pressure receiving chamber.

In the present invention, the pilot valve portion may be provided at each end of the main valve portion, or the pilot valve portion may be provided at one end of the main valve portion.

Advantageous Effects of Invention

In the present invention, since there is no need to form the pilot passage inside the valve body of the main valve portion, distribution of the flow passage is facilitated and the inner structure of the valve body is simplified; accordingly, design and fabrication of the valve body are facilitated.

BRIEF DESCRIPTION OF DRAWINGS

FIG. 4 includes cross-sectional views illustrating an essential portion of a first modification of the spool valve of the first embodiment, in which FIG. 4(a) illustrates an operating state when the pilot valve is off and FIG. 4(b) illustrates an operating state when the pilot valve is on.

FIG. 5 includes cross-sectional views illustrating an essential portion of a second modification of the spool valve of the first embodiment, in which FIG. 5(a) illustrates an operating state when the pilot valve is off and FIG. 5(b) illustrates an operating state when the pilot valve is on.

DESCRIPTION OF EMBODIMENTS

Figure 1:
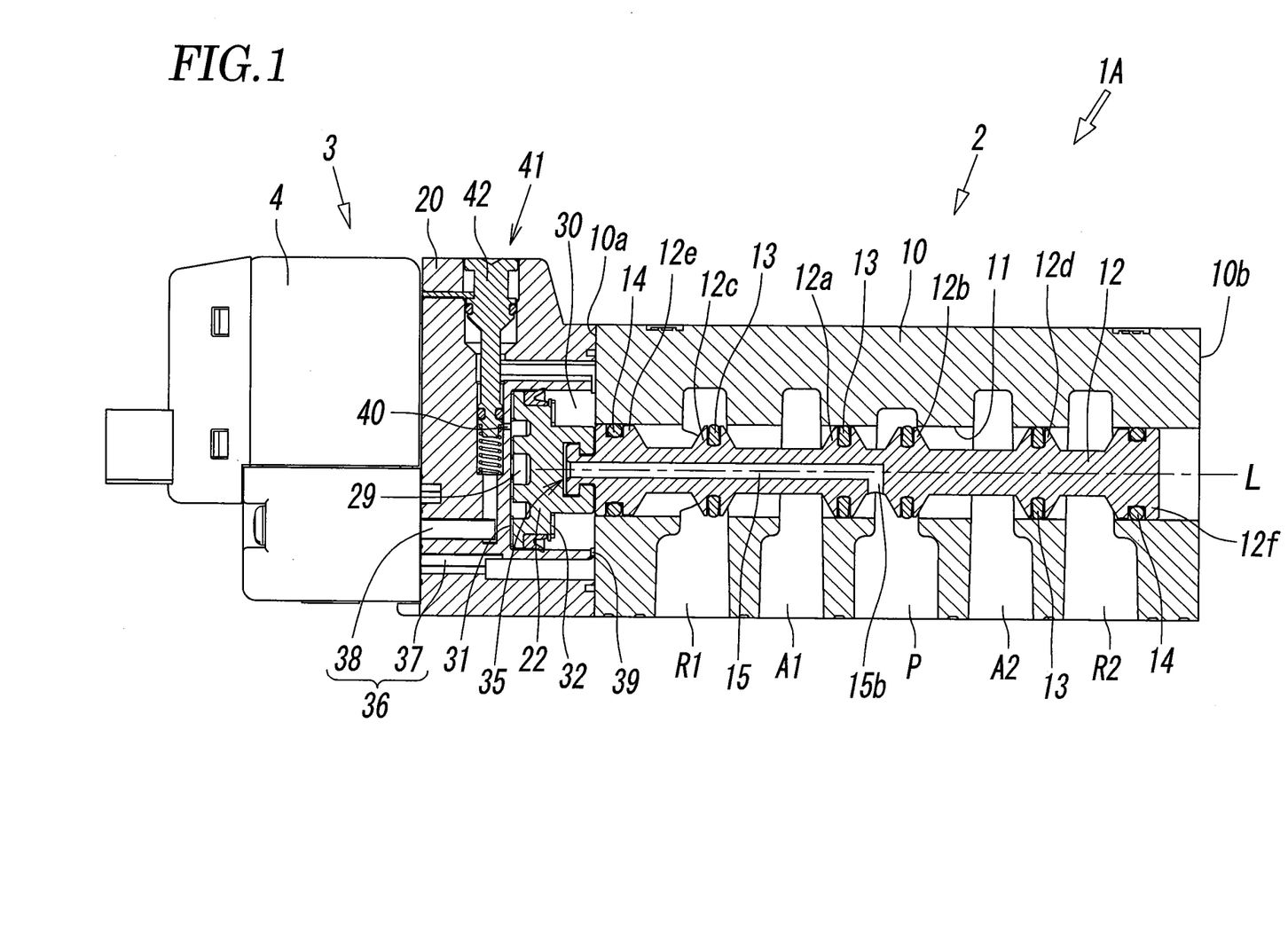
FIG. 1 is a cross-sectional view illustrating a first embodiment of a solenoid-operated pilot type spool valve according to the present invention and is a diagram illustrating a switching state when the pilot valve is off.
Figure 2:
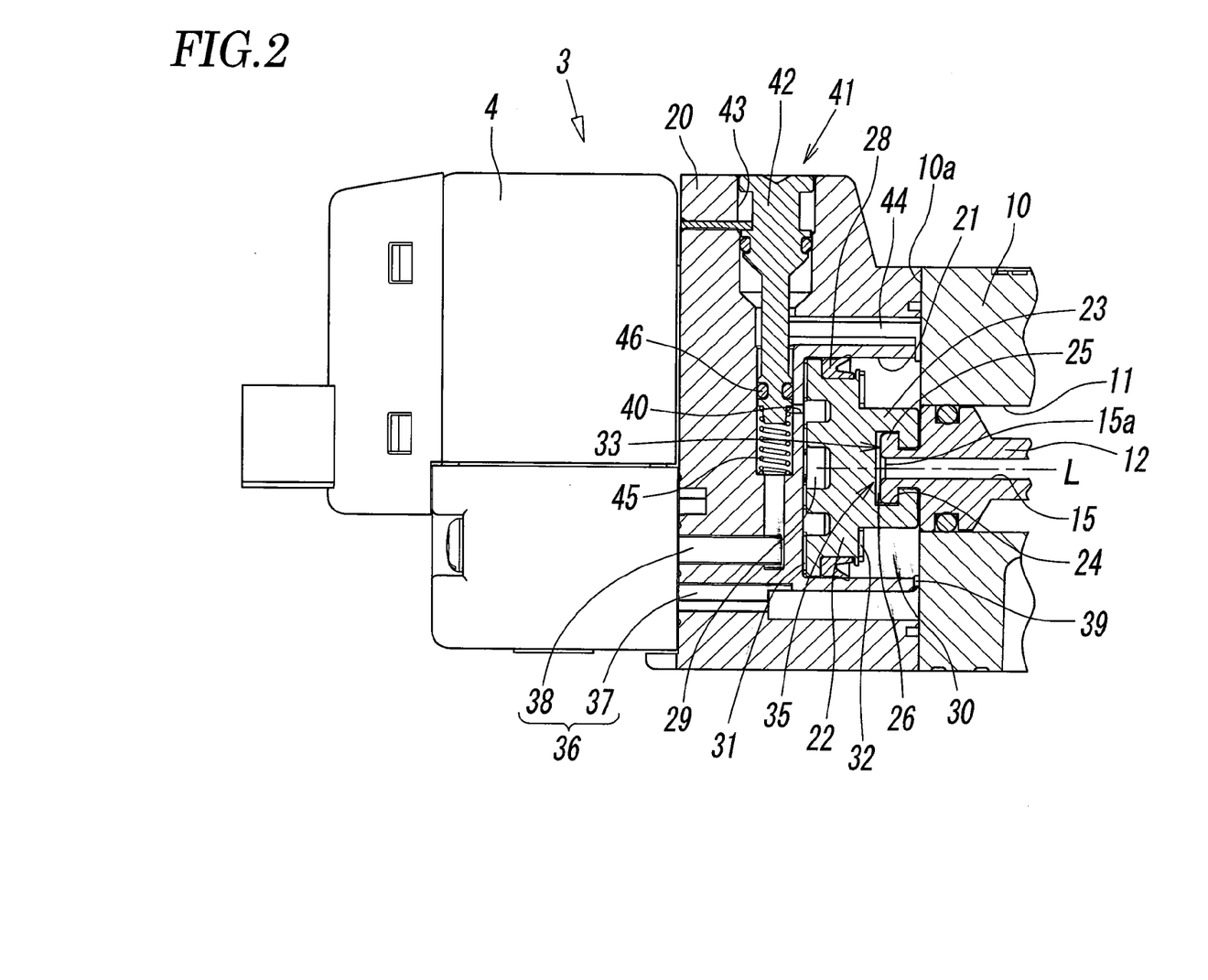
FIG. 2 is an enlarged view of an essential portion of FIG. 1.
Figure 3:
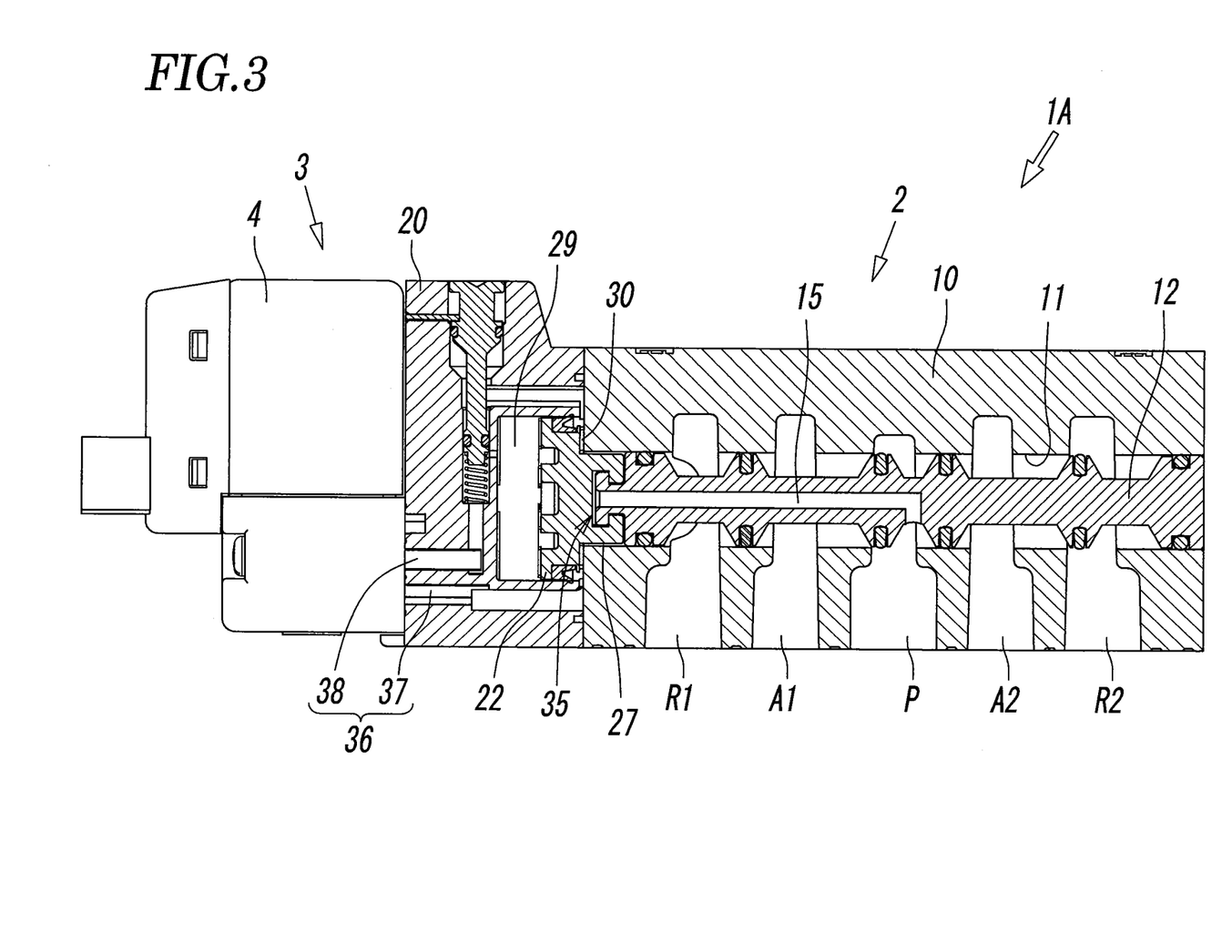
FIG. 3 is a cross-sectional view illustrating a switching state when the pilot valve is on in FIG. 1.

FIGS. 1 to 3 illustrate a first embodiment of a solenoid-operated pilot type spool valve according to the present invention. A spool valve 1A of the first embodiment is a single pilot operated spool valve having a single pilot valve 4 and includes a main valve portion 2 having a valve structure serving as a 5-port valve, and a pilot valve portion 3 that is provided on one end side of the main valve portion 2.

Five ports P, A1, A2, R1, and R2 for input, output, and exhaustion are formed in a valve body 10 of the main valve portion 2. The five ports are arranged such that first and second output ports A1 and A2 are positioned on both sides of an input port P in the middle and such that first and second exhaust ports R1 and R2 are positioned on the outsides of the first and second output ports A1 and A2. Furthermore, a circular valve hole 11 that is in communication with the five ports P, A1, A2, R1, and R2 is formed inside the valve body 10 so as to penetrate the valve body 10 from a first end 10a side to a second end 10b side.

A spool 12 that opens and closes the flow passages connecting adjacent ports to each other is inserted in a slidable manner inside the valve hole 11 in an L-axis direction of the valve hole 11. The spool 12 includes a first land portion 12a that opens and closes a flow passage that connects the input port P and the first output port A1, a second land portion 12b that opens and closes a flow passage that connects the input port P and the second output port A2, a third land portion 12c that opens and closes a flow passage that connects the first output port A1 and the first exhaust port R1, and a fourth land portion 12d that opens and closes a flow passage that connects the second output port A2 and the second exhaust port R2. A sealing member 13 is attached to the outer periphery of each of the land portions 12a to 12d.

Furthermore, the spool 12 includes a first sealing land portion 12e at an end portion outside the third land portion 12c, the first sealing land portion 12e closing a hole end of the valve hole 11 on the first end 10a side at all times, and a second sealing land portion 12f at an end portion outside the fourth land portion 12d, the second sealing land portion 12f closing a hole end of the valve hole 11 on the second end 10b side. A sealing member 14 is attached to the outer periphery of each of the sealing land portions 12e and 12f.

Furthermore, a pilot passage 15 is formed inside the spool 12 so as to extend through the center of the spool 12 in the L-axis direction. One end 15a of the pilot passage 15 is open to an end portion of the spool 12 at the first end 10a side of the valve body 10, and the other end of the pilot passage 15 is, at a position between the first land portion 12a and the second land portion 12b, in communication with a pilot input hole 15b that is open at a lateral side of the spool 12 and is in communication with the input port P through the pilot input hole 15b. The position where the pilot input hole 15b is open is a position where the pilot input hole 15b is in communication with the input port P at all times even in a state in which either of the first land portion 12a and the second land portion 12b opens or closes the flow passage. Accordingly, the pilot passage 15 is in communication with the input port P at all times regardless of the operating position of the spool 12.

The pilot valve portion 3 includes a piston box 20 that is connected to the first end 10a of the valve body 10 and the pilot valve 4 that is coupled to the piston box 20.

A piston chamber 21 that is in communication with an end portion of the valve hole 11 is formed inside the piston box 20, and a pilot piston 22 is accommodated inside the piston chamber 21 so as to be slidable in the L-axis direction. The piston chamber 21 has a diameter that is larger than that of the valve hole 11 and, accordingly, the pilot piston 22 has a diameter that is larger than that of the spool 12.

A piston shaft 23 having a cylindrical shape with a diameter that is slightly smaller than that of the valve hole 11 is formed in a surface of the pilot piston 22 on the side that opposes the spool 12, and by locking a flange-shaped projecting portion 25, which is formed at the end portion of the spool 12, in a groove-shaped recess 24 that traverses the piston shaft 23 in a diametral direction, the pilot piston 22 and the spool 12 are integrally coupled to each other through a gap 26 serving as a constantly open communication passage 35 described later. Furthermore, the piston shaft 23 fits into or escapes from the valve hole 11 upon a switching operation of the spool 12 performed by the pilot piston 22. When the piston shaft 23 is fitted into the valve hole 11, an annular gap 27 (see FIG. 3) that is in communication with the gap 26 is formed between an outer periphery of the piston shaft 23 and an inner periphery of the valve hole 11.

A piston packing 28 is attached to an outer periphery of the pilot piston 22, and with the piston packing 28, a first pressure receiving chamber 29 and a second pressure receiving chamber 30 are partitioned on one side and the other side of the pilot piston 22 and, further, a first pressure receiving surface 31 that faces the first pressure receiving chamber 29 and a second pressure receiving surface 32 that faces the second pressure receiving chamber 30 are formed on one surface and the other surface of the pilot piston 22. The second pressure receiving surface 32 is a surface including an annular surface surrounding a portion around the piston shaft 23 and an end surface of the piston shaft 23, and the pressure receiving area of the second pressure receiving surface 32 is the same as the pressure receiving area of the first pressure receiving surface 31. Meanwhile, the pressure receiving area of a spool pressure receiving surface 33 that is at the end portion of the spool 12 and that faces the second pressure receiving chamber 30 is smaller than the pressure receiving surface of the second pressure receiving surface 32.

The piston packing 28 is a lip-type piston packing that has seal directionality and by directing the lip towards the second pressure receiving chamber 30 side, the piston packing 28 is disposed in a direction that blocks pilot air from going to the first pressure receiving chamber 29 from the second pressure receiving chamber 30 while not blocking the pilot air going to the second pressure receiving chamber 30 from the first pressure receiving chamber 29. However, the piston packing 28 may be an O-ring.

The pilot passage 15 and the second pressure receiving chamber 30 are in communication with each other at all times through the constantly open communication passage 35, and the pilot passage 15 and the first pressure receiving chamber 29 are in communication with each other through an opening/closing communication passage 36 that is opened and closed with the pilot valve 4.

The constantly open communication passage 35 is formed by the gap 26 formed in the connection portion between the spool 12 and the pilot piston 22. Note that the gap 27 formed between the outer periphery of the piston shaft 23 and the inner periphery of the valve hole 11 when the piston shaft 23 is fitted in the valve hole 11 may also be referred to as a portion of the constantly open communication passage 35.

Meanwhile, the opening/closing communication passage 36 is formed in the piston box 20 and is separated into a first communication passage portion 37 that connects the second pressure receiving chamber 30 and the pilot valve 4 to each other and a second communication passage portion 38 that connects the pilot valve 4 and the first pressure receiving chamber 29 to each other. The first communication passage portion 37 in communication with the second pressure receiving chamber 30 through a first communication hole 39 is in communication with the pilot passage 15 at all times through the second pressure receiving chamber 30 and the constantly open communication passage 35, and the second communication passage portion 38 is in communication with the first pressure receiving chamber 29 through a second communication hole 40 formed in an operation hole 43 of a manual operation portion 41.

The pilot valve 4 is a 3-port solenoid valve. When the pilot valve 4 is energized, the first communication passage portion 37 and the second communication passage portion 38 of the opening/closing communication passage 36 communicate with each other such that the pilot air from the second pressure receiving chamber 30 is supplied to the first pressure receiving chamber 29, and when the pilot valve 4 is de-energized, the first communication passage portion 37 and the second communication passage portion 38 of the opening/closing communication passage 36 are blocked with respect to each other and the second communication passage portion 38 is released to the atmosphere such that the pilot air inside the first pressure receiving chamber 29 is discharged to the atmosphere.

The piston box 20 is provided with the manual operation portion 41. The manual operation portion 41 is a portion for creating the same condition as when the pilot valve 4 is energized, at times of power failure or during maintenance, by manual operation of an operation element 42. The operation element 42 is accommodated inside the operation hole 43 so as to be capable of performing a push-down operation. The operation hole 43 is in communication with the second pressure receiving chamber 30 through a manual pilot flow passage 44, and the second communication hole 40 of the second communication passage portion 38 is formed in a portion of the operation hole 43.

As illustrated in FIGS. 1 to 3, normally, the operation element 42 is pushed and lifted up by a return spring 45 to a non-operational position, and at this time, since an O-ring 46 of the operation element 42 is positioned above the second communication hole 40 (on the manual pilot flow passage 44 side), the manual pilot flow passage 44 is blocked; however, the second communication passage portion 38 is not blocked.

From the above state, when the operation element 42 is pushed down, the O-ring 46 moves to a position below the second communication hole 40 (on the second communication passage portion 38 side); accordingly, the second communication passage portion 38 is blocked with respect to the second communication hole 40, and the manual pilot flow passage 44 is made to communicate with the second communication hole 40. Accordingly, the pilot air is supplied to the second pressure receiving chamber 30 through the manual pilot flow passage 44 and the pilot piston 22 is operated.

A function of the spool valve 1A of the first embodiment having the above-described configuration is as follows. FIG. 1 illustrates a switching state when the pilot valve 4 is off. At this time, with the pilot valve 4, the first communication passage portion 37 and the second communication passage portion 38 of the opening/closing communication passage 36 are blocked and the second communication passage portion 38 is released to the atmosphere such that the pilot air of the first pressure receiving chamber 29 is discharged to the atmosphere. Accordingly, the pilot piston 22 is pushed to the left by the pilot air supplied from the input port P to the second pressure receiving chamber 30 through the pilot passage 15 and the constantly open communication passage 35 and occupies, together with the spool 12, a first switching position in the drawing. At this time, in the main valve portion 2, the input port P and the second output port A2 are made to communicate with each other, the first output port A1 and the first exhaust port R1 are made to communicate with each other, and the second exhaust port R2 is blocked.

From the above state, when the pilot valve 4 is turned on, the first communication passage portion 37 and the second communication passage portion 38 of the opening/closing communication passage 36 communicate with each other; accordingly, air is supplied to the first pressure receiving chamber 29 through the opening/closing communication passage 36 such that a pressure of the air acts on the first pressure receiving surface 31. Since the pressure receiving area of the first pressure receiving surface 31 is the same as the pressure receiving area of the second pressure receiving surface 32, acting forces on both sides of the pilot piston 22 that act in the opposite direction with respect to each other are balanced; however, in the connection portion between the spool 12 and the pilot piston 22, with air pressure acting in the right direction of the figure and on the spool pressure receiving surface 33 formed on the end face of the spool 12, the spool 12 is moved to the right together with the pilot piston 22, thus, occupies a second switching position in FIG. 3. As a result, in the main valve portion 2, the input port P and the first output port A1 are made to communicate with each other, the second output port A2 and the second exhaust port R2 are made to communicate with each other, and the first exhaust port R1 is blocked.

As described above, in the spool valve 1A of the first embodiment, the pilot passage 15 is formed in the spool 12, the second pressure receiving chamber 30 on one side of the pilot piston 22 is made to communicate with the input port P at all times with the pilot passage 15, and the pilot air is supplied to the first pressure receiving chamber 29 on the other side through the second pressure receiving chamber 30 with the opening/closing communication passage 36 that is opened and closed by the pilot valve 4; accordingly, the spool 12 can be switched by supplying the pilot air to both sides of the single pilot piston 22 with the single pilot valve 4. Furthermore, since there is no need to form the pilot passage 15 inside the valve body 10 of the main valve portion 2, distribution of the flow passage is facilitated and the inner structure of the valve body 10 is simplified; accordingly, design and fabrication of the valve body 10 are facilitated.

Figure 4:
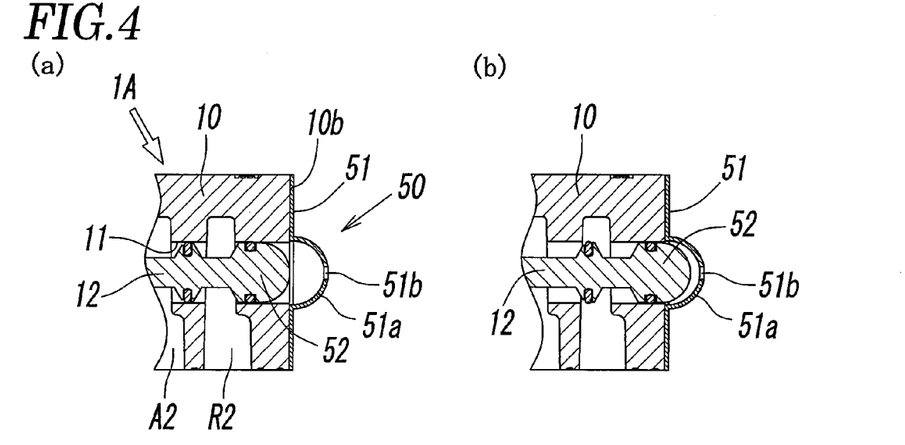

FIGS. 4(a) and 4(b) illustrate an essential portion of a first modification of the spool valve 1A of the first embodiment. In the first modification, an indicator 50 for checking the switching position of the spool 12 is provided in the spool valve 1A. The indicator 50 is formed by a transparent cover 51 that is attached to an end portion of the valve body 10 on the second end 10b side and a portion 52 to be detected that is formed at the end portion of the spool 12.

The cover 51 includes a hemispherically surfaced transparent portion 51a, which is bent in a convex shape towards the outside, at a portion that faces the end portion of the valve hole 11, and an open hole 51b, which releases the transparent portion 51a to the atmosphere, is formed at the center portion of the transparent portion 51a.

Meanwhile, the portion 52 to be detected is formed by the hemispherical portion of the end portion of the spool 12 and the portion 52 to be detected is allowed to be fitted into or to escape from the inside of the transparent portion 51a. The portion 52 to be detected may be colored with a color that can easily stand out, such as red, orange, or the like.

Moreover, as in FIG. 1, when the pilot valve 4 is in an off state and the spool 12 is in the first switching position, as illustrated in FIG. 4(a), the portion 52 to be detected is positioned inside the valve hole 11 and is not sighted through the transparent portion 51a by not being fitted into the inside of the transparent portion 51a; accordingly, the spool 12 can be confirmed to be in the first switching position.

On the other hand, as in FIG. 3, when the pilot valve 4 is in an on state and the spool 12 is in the second switching position, as illustrated in FIG. 4(b), the portion 52 to be detected is fitted into the inside of the transparent portion 51a and is sighted through the transparent portion 51a; accordingly, the spool 12 can be confirmed to be in the second switching position.

Figure 5:
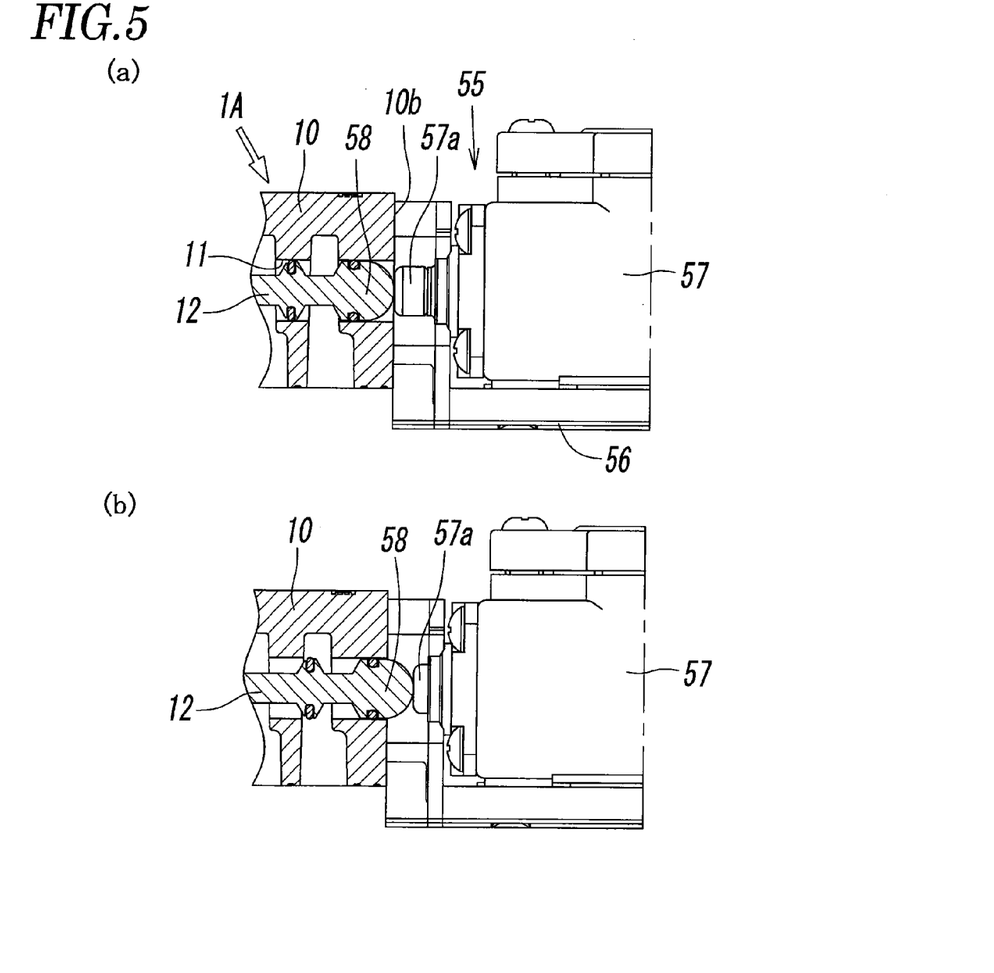

FIGS. 5(a) and 5(b) illustrate an essential portion of a second modification of the spool valve 1A of the first embodiment. In the second modification, a position detection device 55 for detecting the switching position of the spool 12 is provided in the spool valve 1A.

In the position detection device 55, a change-over switch 57 that is switched on and off with a push button 57a is attached to a bracket 56 that is attached to the second end 10b of the valve body 10, and the push button 57a of the change-over switch 57 is disposed so as to oppose a hemispherical pressing portion 58 of the end portion of the spool 12.

Moreover, as in FIG. 1, when the pilot valve 4 is in an off state and the spool 12 is in the first switching position, as illustrated in FIG. 5(a), the push button 57a is not pushed by the pressing portion 58 of the spool 12; accordingly, the change-over switch 57 is in an off state and no position detection signal is output from the change-over switch 57.

On the other hand, as in FIG. 3, when the pilot valve 4 is in an on state and the spool 12 is in the second switching position, as illustrated in FIG. 5(b), the push button 57a pushed by the pressing portion 58 of the spool 12 is displaced; accordingly, the change-over switch 57 is turned on and a position detection signal is output from the change-over switch 57 to a control device and a display device (not shown).

Figure 6:
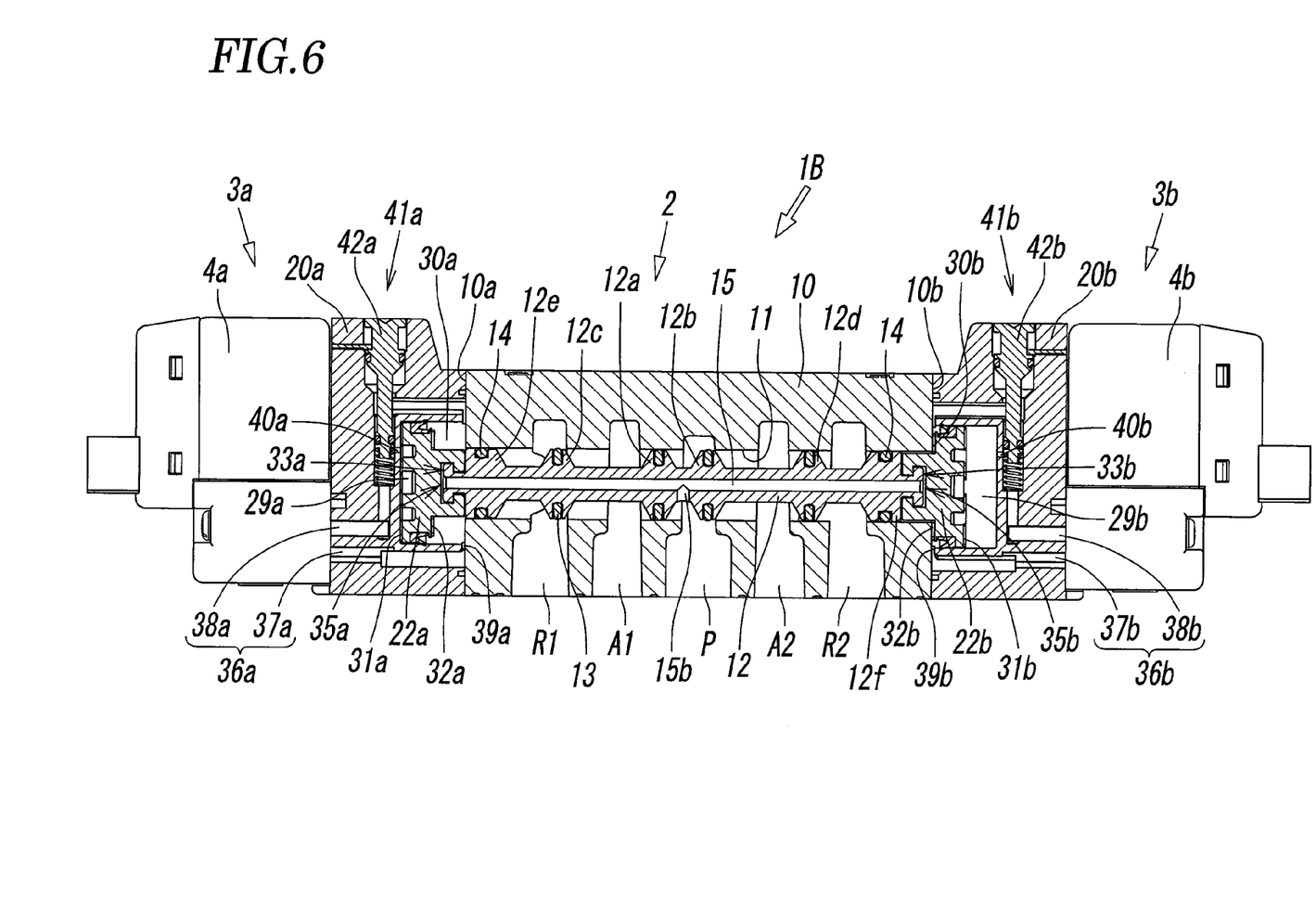
FIG. 6 is a cross-sectional view illustrating a second embodiment of the solenoid-operated pilot type spool valve according to the present invention and is a diagram illustrating a switching state when one pilot valve is on and the other pilot valve is off.

FIG. 6 illustrates a second embodiment of the solenoid-operated pilot type spool valve according to the present invention. A spool valve 1B of the second embodiment is different from the spool valve 1A of the first embodiment in that the spool valve 1B is a double pilot operated spool valve having two pilot valves. In other words, the spool valve 1B of the second embodiment includes a pilot valve portion on both the first end 10a side and the second end 10b side of the valve body 10 of the main valve portion 2.

A first pilot valve portion 3a that is provided on the first end 10a side of the valve body 10 and a second pilot valve portion 3b that is provided on the second end 10b side are disposed opposite each other on the left and right. The first pilot valve portion 3a and the second pilot valve portion 3b have practically the same configuration with respect to each other and have practically the same configuration as the pilot valve portion 3 of the spool valve 1A of the first embodiment.

Furthermore, the configuration of the main valve portion 2 has the same configuration as the main valve portion 2 of the spool valve 1A of the first embodiment except that the pilot passage 15 is formed inside the spool 12 so as to penetrate the spool 12 in the L-axis direction.

Accordingly, in order to avoid repetition of description, in FIG. 6, the main portions of the main valve portion 2 are attached with the same reference numerals as those of the main valve portion 2 of the spool valve 1A of the first embodiment, the main portions of the first pilot valve portion 3a are attached with reference numerals in which "a" is attached to the reference numerals of the pilot valve portion 3 of the spool valve 1A of the first embodiment, and the second pilot valve portion 3b is attached with a reference numeral in which "b" is attached to the reference numeral of the pilot valve portion 3 of the spool valve 1A of the first embodiment, and description of the configuration is omitted.

A function of the spool valve 1B of the second embodiment having the above-described configuration is as follows. FIG. 6 illustrates a switching state in which a pilot valve 4a of the first pilot valve portion 3a is off and a pilot valve 4b of the second pilot valve portion 3b is on.

At this time, in the first pilot valve portion 3a, with the pilot valve 4a, a first communication passage portion 37a and a second communication passage portion 38a of an opening/closing communication passage 36a are blocked and the second communication passage portion 38a is released to the atmosphere such that the pilot air of a first pressure receiving chamber 29a is discharged to the atmosphere.

Meanwhile, in the second pilot valve portion 3b, a first communication passage portion 37b and a second communication passage portion 38b of an opening/closing communication passage 36b communicate with each other; accordingly, pilot air is supplied to a first pressure receiving chamber 29b through the opening/closing communication passage 36b such that a pressure of the pilot air acts on a first pressure receiving surface 31b of a pilot piston 22b.

Furthermore, although the pilot air is supplied from the input port P at all times to a second pressure receiving chamber 30a of the first pilot valve portion 3a and to a second pressure receiving chamber 30b of the second pilot valve portion 3b through the pilot passage 15 and air pressures act on second pressure receiving surfaces 32a and 32b of pilot pistons 22a and 22b in opposite directions, since the two pilot pistons 22a and 22b have the same diameter with respect to each other and the pressure receiving areas of the second pressure receiving surfaces 32a and 32b are the same, acting forces that each act on the pilot pistons 22a and 22b in opposite directions with respect to each other are balanced. Furthermore, the acting forces that act on spool pressure receiving surfaces 33a and 33b at both ends of the spool 12 in opposite directions with respect to each other are balanced as well.

Accordingly, the spool 12 is pushed in the left direction with the pilot piston 22b of the second pilot valve portion 3b such that the first switching position in the drawing is occupied.

Moreover, at this time, in the main valve portion 2, the input port P and the second output port A2 are in communication with each other, the first output port A1 and the first exhaust port R1 are in communication with each other, and the second exhaust port R2 is blocked.

From the above state, when the pilot valve 4a of the first pilot valve portion 3a is turned on and the pilot valve 4b of the second pilot valve portion 3b is turned off, the pilot air inside the first pressure receiving chamber 29b of the second pilot valve portion 3b is discharged to the atmosphere and the pilot air is supplied to the first pressure receiving chamber 29a of the first pilot valve portion 3a; accordingly, the spool 12 is pushed in the right direction of FIG. 6 with the pilot piston 22a of the first pilot valve portion 3a and is switched to the second pivoting position that is opposite to that of FIG. 6.

At this time, in the main valve portion 2, the input port P and the first output port A1 are in communication with each other, the second output port A2 and the second exhaust port R2 are in communication with each other, and the first exhaust port R1 is blocked.

Furthermore, as illustrated in FIG. 6, in a state in which the pilot valve 4a of the first pilot valve portion 3a is off and the pilot valve 4b of the second pilot valve portion 3b is on while the spool 12 occupies the first switching position, when the pilot valve 4b of the second pilot valve portion 3b is turned off, the spool 12 maintains the first switching position without any change. In a similar manner, in a state in which the pilot valve 4a of the first pilot valve portion 3a is on and the pilot valve 4b of the second pilot valve portion 3b is off while the spool 12 occupies the second switching position, when the pilot valve 4a of the first pilot valve portion 3a is turned off, the spool 12 maintains the second switching position without any change.

In the second embodiment as well, since there is no need to form the pilot passage 15 inside the valve body 10 of the main valve portion 2, distribution of the flow passage is facilitated and the inner structure of the valve body 10 is simplified; accordingly, design and fabrication of the valve body 10 are facilitated.

Note that in the single pilot operated spool valve 1A of the first embodiment, the pilot piston 22 is formed as a different body with respect to the spool 12 and is integrally coupled to the spool 12; however, the spool 12 and the pilot piston 22 may be formed integrally with a single material. In such a case, the constantly open communication passage 35 that connects the pilot passage 15 inside the spool 12 and the second pressure receiving chamber 30 to each other may be formed by a through hole that is in communication with the second pressure receiving chamber 30 and that is open in an outer periphery of the spool 12 or the pilot piston 22 at a continuous portion between the spool 12 and the pilot piston 22.

Furthermore, in the case of the double pilot operated spool valve 1B of the second embodiment as well, one pilot piston 22a and the spool 12 may be integrally formed with a single material and the other pilot piston 22b may be formed as a different body with respect and the spool 12 and maybe coupled to the spool 12.

Furthermore, although each of the embodiments illustrated in the drawings is a 5-port spool valve, the present invention can be applied to spool valves with other numbers of ports such as a 3-port type, a 4-port type, and the like.

REFERENCE SIGNS LIST 1A, 1B: spool valve
2: main valve portion
3: pilot valve portion
4: pilot valve
10: valve body
10a: first end
10b: second end
11: valve hole
12: spool
15: pilot passage
20, 20a, 20b: piston box
21, 21a, 21b: piston chamber
22, 22a, 22b: pilot piston
26: gap
28: piston packing
29, 29a, 29b: first pressure receiving chamber
30, 30a, 30b: second pressure receiving chamber
35, 35a, 35b: constantly open communication passage
36, 36a, 36b: opening/closing communication passage
P: input port
A1, A2: output port
R1, R2: exhaust port
L: axis

The invention claimed is:

1. A solenoid-operated pilot type spool valve, comprising:
a main valve portion that includes
  a valve body having input, output, and exhaustion ports,
  a valve hole formed inside the valve body so as to penetrate the valve body and so as to be in communication with the ports,
  a spool that is inserted into the valve hole so as to be slidable in an axis direction of the valve hole, the spool opening and closing flow passages that connect the ports to each other, and
  a pilot passage that is formed inside the spool, the pilot passage being in communication with the input port at all times irrespective of an operating position of the spool; and
a pilot valve portion provided at an end portion of the valve body;
the pilot valve portion that includes
  a piston box connected to the valve body,
  a pilot piston that is formed so as to be continuous with an end portion of the spool and that is accommodated inside the piston box in a slidable manner, the pilot piston having a diameter that is larger than a diameter of the spool,
  a first pressure receiving chamber and a second pressure receiving chamber that are partitioned on one side and the other side of the pilot piston,
  a constantly open communication passage that is formed in a continuous portion between the spool and the pilot piston so as to communicate the pilot passage and the second pressure receiving chamber to each other at all times,
  an opening/closing communication passage that is formed in the piston box so as to communicate the pilot passage and the first pressure receiving chamber to each other through a pilot valve, and the pilot valve of a solenoid-operated type that opens and closes the opening/closing communication passage.

2. The spool valve according to claim 1, wherein by having one end be in communication with the second pressure receiving chamber, the opening/closing communication passage is in communication with the pilot passage through the second pressure receiving chamber and the constantly open communication passage.

3. The spool valve according to claim 1, wherein the pilot piston is formed as a different body with respect to the spool and is coupled to the spool, and the constantly open communication passage is formed by a gap interposed between the spool and the pilot piston.

4. The spool valve according to claim 3, wherein a pressure receiving area of a first pressure receiving surface of the pilot piston that faces the first pressure receiving chamber and a pressure receiving area of a second pressure receiving surface of the pilot piston that faces the second pressure receiving chamber are equivalent to each other, and a pressure receiving area of a spool pressure receiving surface of the spool that faces the second pressure receiving chamber is smaller than the pressure receiving area of the second pressure receiving surface of the pilot piston.

5. The spool valve according to claim 1, wherein the pilot piston and the spool are integrally formed by a single material, and the constantly open communication passage is open in a lateral side of the pilot piston or in a lateral side of the spool and is formed by a through hole that is in communication with the second pressure receiving chamber.

6. The spool valve according to claim 1, wherein a piston packing that is attached to an outer periphery of the pilot piston is a lip-type piston packing that has seal directionality, and the piston packing is disposed in a direction that does not block air from going to the second pressure receiving chamber from the first pressure receiving chamber but blocks air from going to the first pressure receiving chamber from the second pressure receiving chamber.

7. The spool valve according to claim 1, wherein a pilot valve portion is provided at each end of the main valve portion.

8. The spool valve according to claim 1, wherein the pilot valve portion is provided at one end of the main valve portion.

* * * * *